R. REID.
SECURING OF TIRES ON THE WHEELS OF ROAD VEHICLES.
APPLICATION FILED JAN. 14, 1915.
1,258,461.
Patented Mar. 5, 1918.
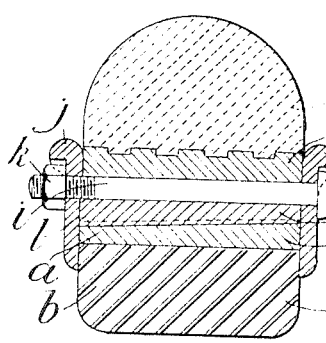
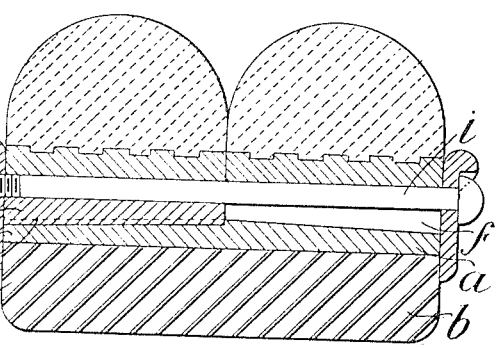
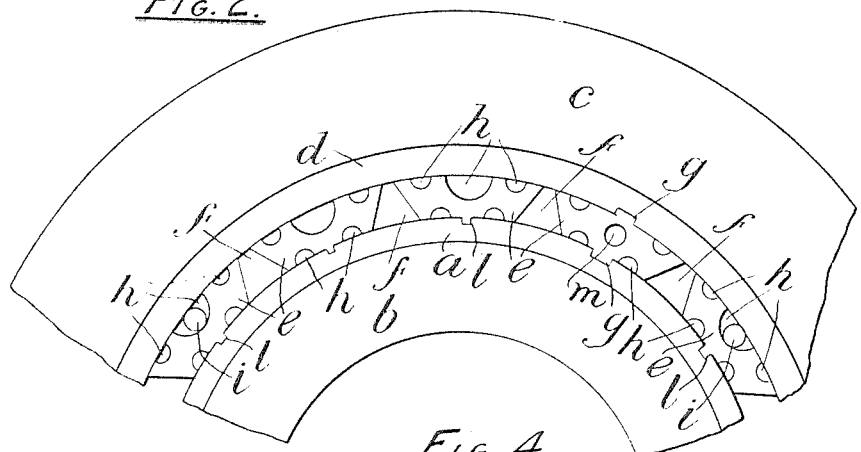
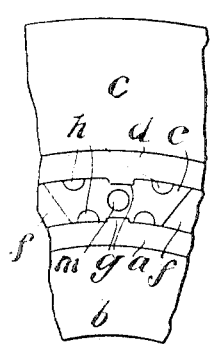
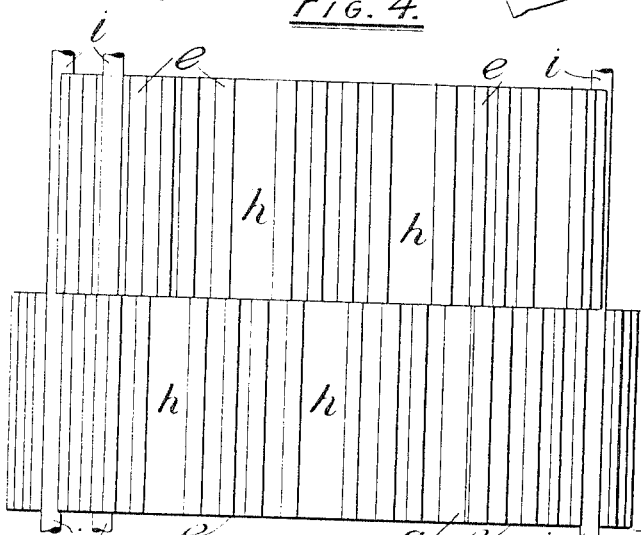
Witnesses:
George C. Jepson
Will A. Simons
Inventor:
Robert Reid
by his Attorneys
Howard Howard

UNITED STATES PATENT OFFICE.

ROBERT REID, OF GLASGOW, SCOTLAND.

SECURING OF TIRES ON THE WHEELS OF ROAD-VEHICLES.

1,258,461.

Specification of Letters Patent. Patented Mar. 5, 1918.

Application filed January 14, 1915. Serial No. 2,222.

*To all whom it may concern:*

Be it known that I, ROBERT REID, manager, a subject of the King of Great Britain and Ireland, and a resident of Glasgow, Scotland, have invented new and useful Improvements in the Securing of Tires on the Wheels of Road-Vehicles, of which the following is a specification.

This invention has reference to and comprises improvements in and relating to the securing of tires on the wheels of road vehicles.

In a wheel constructed according to the improvements of this invention a metal felly binding band having its outer surface or periphery tapered or inclined at an angle to its inner surface is fitted around the felly and the resilient tread portion of the tire is vulcanized to a metal band arranged to encircle the said felly binding band. A series of metal transverse wedges are fitted between said two bands at spaced distances apart and wooden blocks or wedges are arranged between each pair of metal wedges. Transverse bolts passing through the wedges and through the usual detachable side ring flanges securely hold the said wedges in position while the creeping of the wedges or of the tread portion of the tire around the felly binding band is prevented by transverse tongues in the wedges engaging in transverse grooves in the bands or vice versa.

In wheel tires of the above type, difficulty which is sometimes experienced in removing the tire is often caused by the steel wedges and bands rusting together and when a comparatively large surface of the wedges and bands are in contact this difficulty is increased. In tires of the solid class it is practically necessary to support the tires around the greater part of their circumference. This tire is easily detachable from the wheel, the aforesaid difficulty being overcome, by decreasing the area of the contacting surfaces of the wedges while the tire is still adequately supported around the greater part of its circumference.

For convenience of explanation the sides of the wedges which bear against the bands are hereafter termed the "non-parallel" sides while the other sides are termed the "parallel" sides.

Instead of the wooden wedges aforesaid, a space is left between each pair of wedges and in order that the wedges may be driven into and out of position with greater facility than heretofore, the amount of bearing surface of each wedge is decreased without changing the distance apart of the parallel sides of the wedges. This is accomplished by forming grooves, preferably semi-circular in section, in the non-parallel surfaces of the wedges.

In applying these improvements to a twin tire the wedges on one side of the wheel which is fitted with a felly binding band of a double inclined formation are arranged at spaced distances apart, while the wedges on the other side of the wheel are similarly arranged, but the wedges on the one side are opposite the spaces on the other side so that transverse binding bolts are passed through one of the grooves in certain of the wedges and through the opposite space, and the spaces are of such a size that the bolts can pass freely through them.

In the single tire the bolts are passed through one of the grooves in certain of the wedges, or it may be through certain of the spaces between the wedges.

It will be observed that in the twin tire the wedges may be easily removed by first removing the usual side flanges or rings, then inserting a rod-like tool through the space against the inner end of the wedge and knocking out the wedge by a blow from a hammer. By passing the bolts through grooves in the wedges the bolts and wedges will not have as great a tendency to rust together as they would have if the bolts were passed through holes in the wedges.

One of the wedges may be fitted with the key and groove arrangements for preventing creeping and a transverse hole may be formed through the center of this wedge. The other wedges are formed with a small projecting tongue or guiding member which slides in a groove in the felly binding band so as to space the wedges an equal distance apart around the band.

By this construction of wheel the weight of same will be less and there will also be a saving in material, both these advantages being due to the spaces between each pair of wedges and to the grooves in the wedges, while the appliances will be applicable to all standard makes of band tires.

In order that others skilled in the art to which this invention relates may properly understand the same I have hereunto appended one sheet of explanatory drawings in which Figure 1 is a transverse sectional elevation of a wheel tire constructed according to the improvements of this invention. Fig. 2 is a side elevation, broken away, and corresponding to Fig. 1, but with the usual detachable side ring flanges removed. Fig. 3 is a view similar to Fig. 1 but illustrating the application of the improvements of this invention to a twin or duplex tire. Fig. 4 is a plan view, broken away, and corresponding to Fig. 3, but with the resilient tread portion of the tire and its band removed, and Fig. 5 is a fragmentary section illustrating a modification.

Referring to these drawings:—

In carrying the improvements of this invention into effect or practice the felly binding band $a$ which is secured to the felly $b$ has its outer periphery tapered or angled as shown by Fig. 1. In the duplex tire this outer surface or periphery is formed with a double inclination or taper as shown at $a'$ in Fig. 3. The resilient tread part $c$ of the tire vulcanized to the metal band $d$ is adapted to encircle the wedges $e$ arranged between the same and the band $a$ at spaced distances apart, so that a space $f$, or it may be a wooden wedge, is left between each wedge $e$ and its neighbor. The creeping of the tire may be prevented by keys $g$ formed on one of the wedges $e$ and engaging in grooves formed in the bands $a$ and $d$ as shown in Fig. 2 or the grooves may be formed in the wedge and the keys on the bands, while this wedge is formed with a hole $m$ so as to lighten same. Transverse grooves $h$ are formed in the sides of each wedge $e$ adjacent the band $a$, and the bolts $i$ pass through one of the grooves $h$ in certain of the wedges $e$ and through the usual side ring flanges $j$ and are secured by nuts $k$ in the usual manner.

Each wedge is formed with a small tongue or guiding member $l$ which slides in a groove in the band $a$ so as to space the wedges $e$ at equal distances apart around said band $a$.

What I claim and desire to secure by Letters Patent is:—

The combination in a wheel of a felly; a metal band thereon of a thickness increasing from one edge at least as far as its central plane; a resilient tire; a second metal band carrying the tire; wedges extending transversely of the wheel between said bands and having open grooves in their faces; with retaining bolts passing through certain of said grooves so as to be exposed.

In testimony whereof, I have signed my name to this specification, in the presence of two subscribing witnesses.

ROBERT REID.

Witnesses:
 JOHN STEWARD,
 R. C. THOMSON.